Nov. 7, 1939.　　　　R. H. BARNARD　　　　2,179,317
METHOD OF AND APPARATUS FOR FORMING GLASS BUILDING BLOCKS
Filed July 10, 1936　　　　8 Sheets-Sheet 4
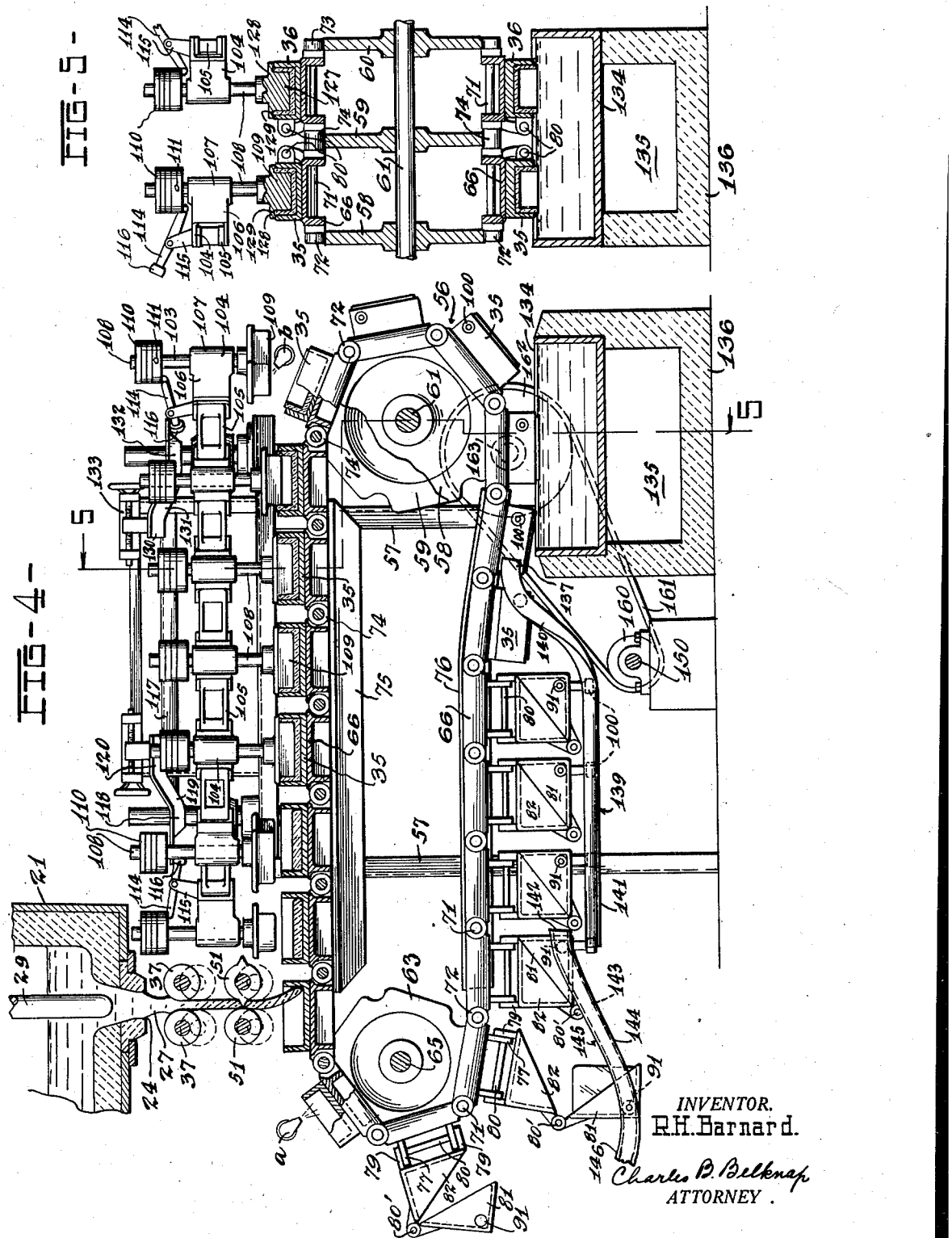
INVENTOR.
R.H. Barnard.
Charles B. Belknap
ATTORNEY.

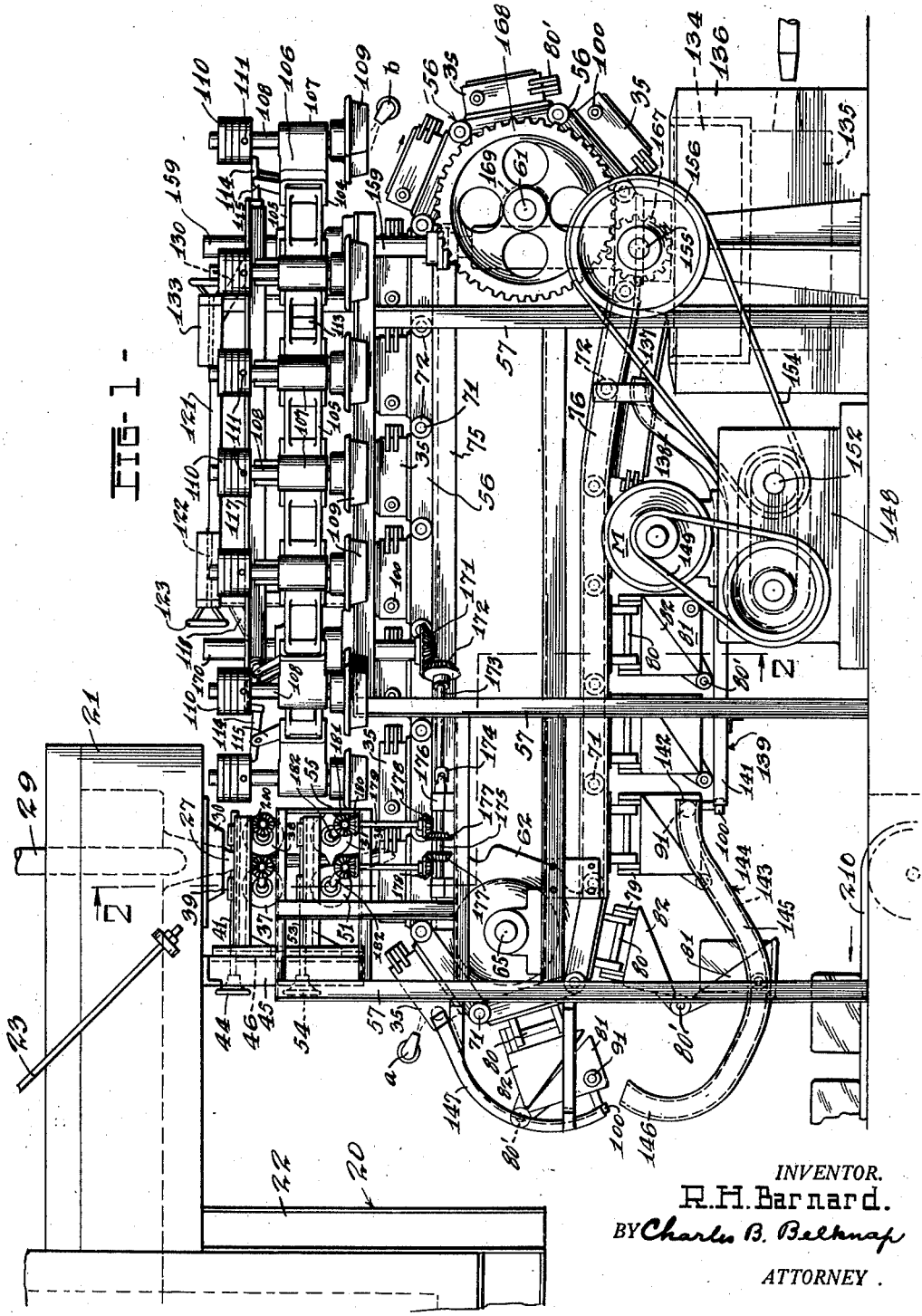

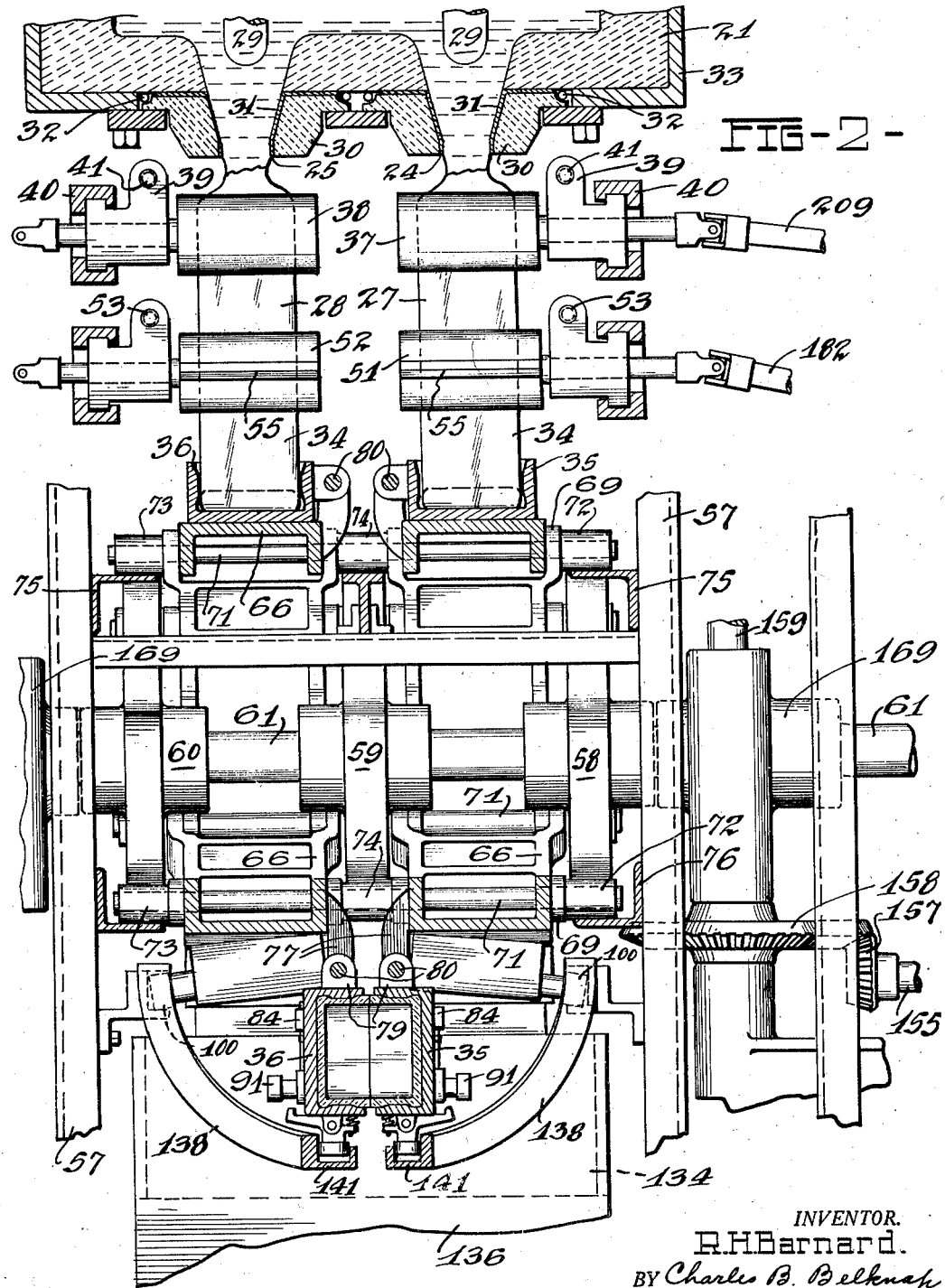
Nov. 7, 1939.                R. H. BARNARD                2,179,317
METHOD OF AND APPARATUS FOR FORMING GLASS BUILDING BLOCKS
Filed July 10, 1936          8 Sheets-Sheet 2
FIG-2-
INVENTOR.
R. H. Barnard.
BY Charles B. Belknap
ATTORNEY.

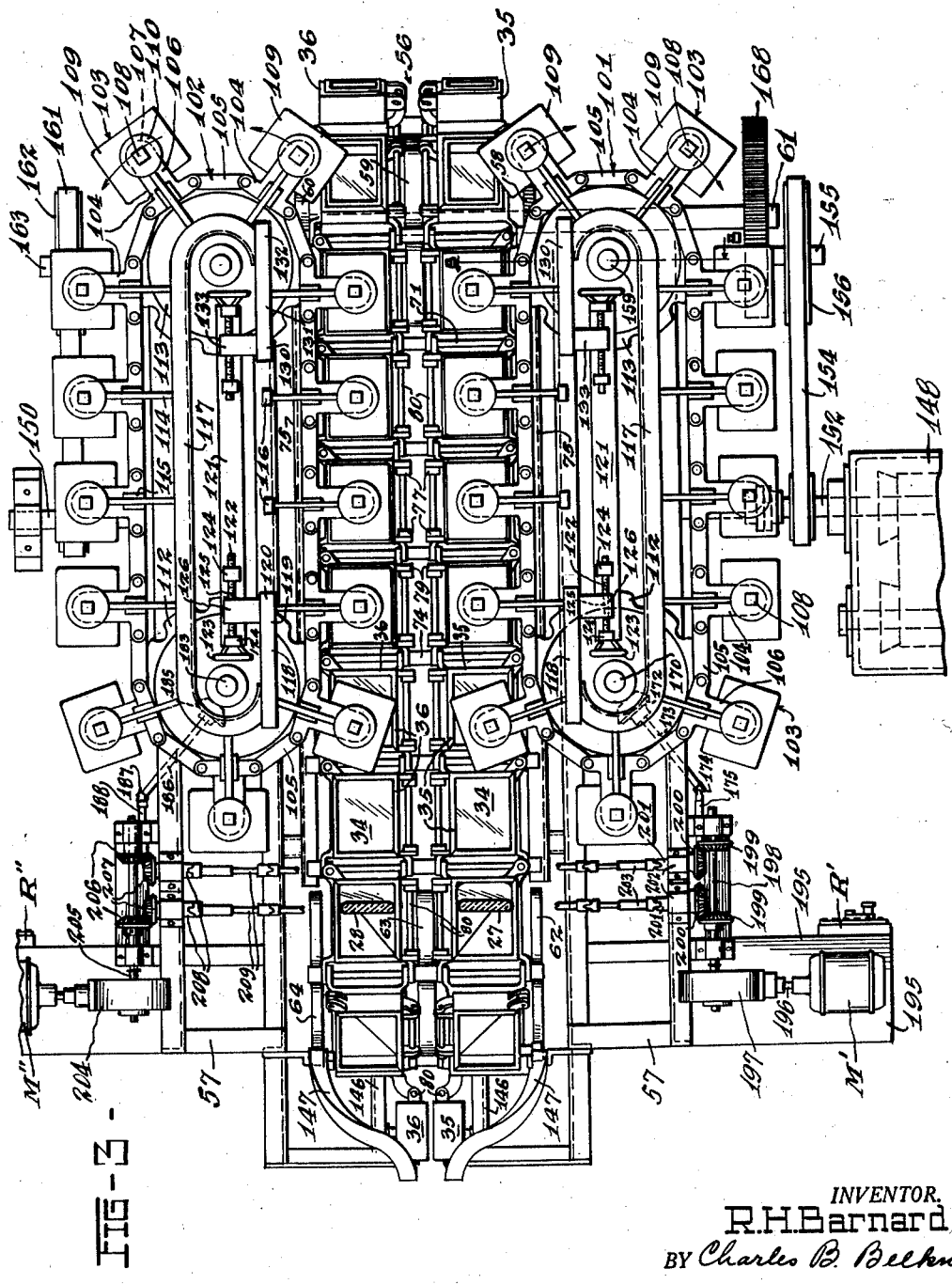

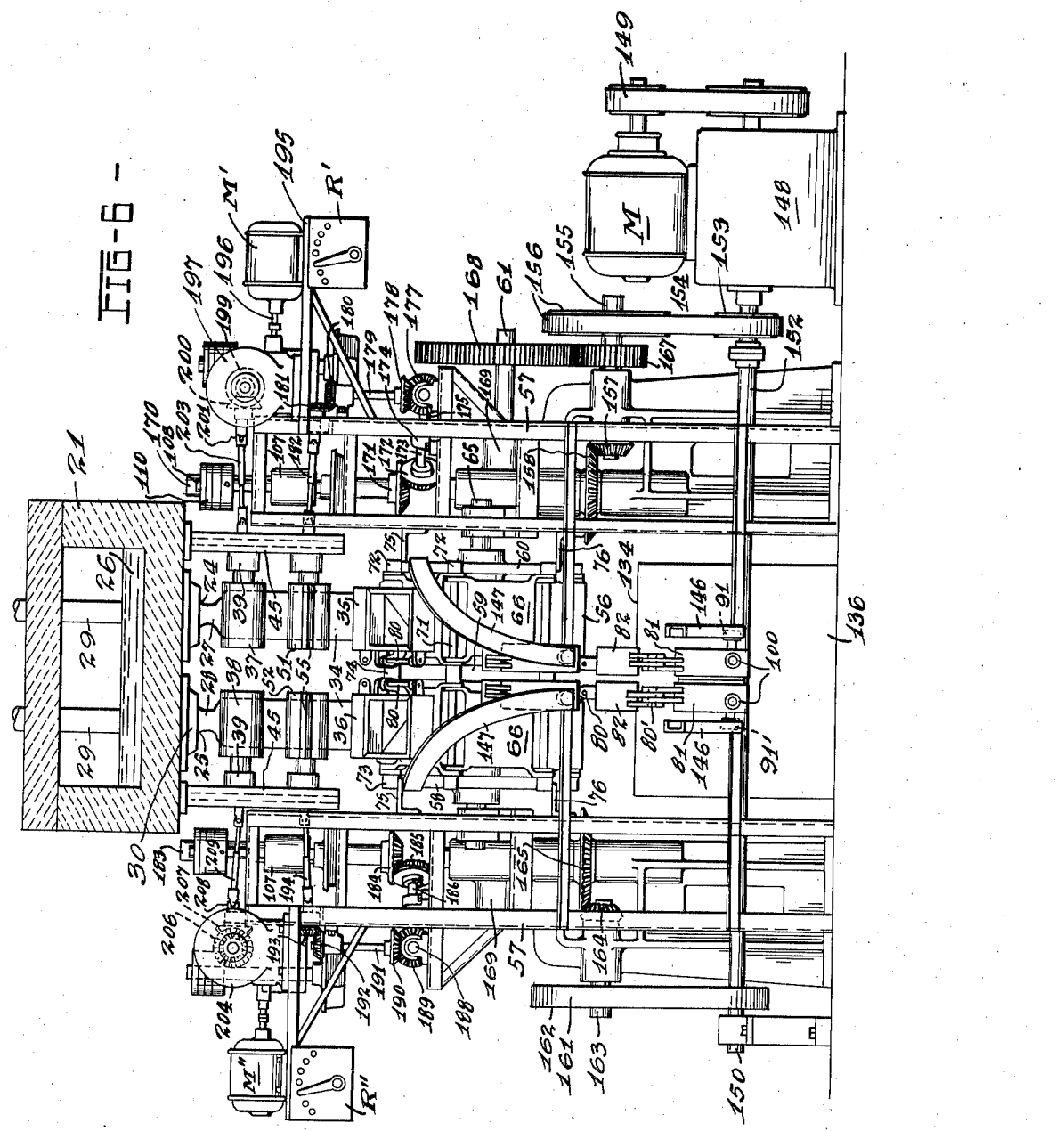

Nov. 7, 1939.    R. H. BARNARD    2,179,317
METHOD OF AND APPARATUS FOR FORMING GLASS BUILDING BLOCKS
Filed July 10, 1936    8 Sheets-Sheet 6
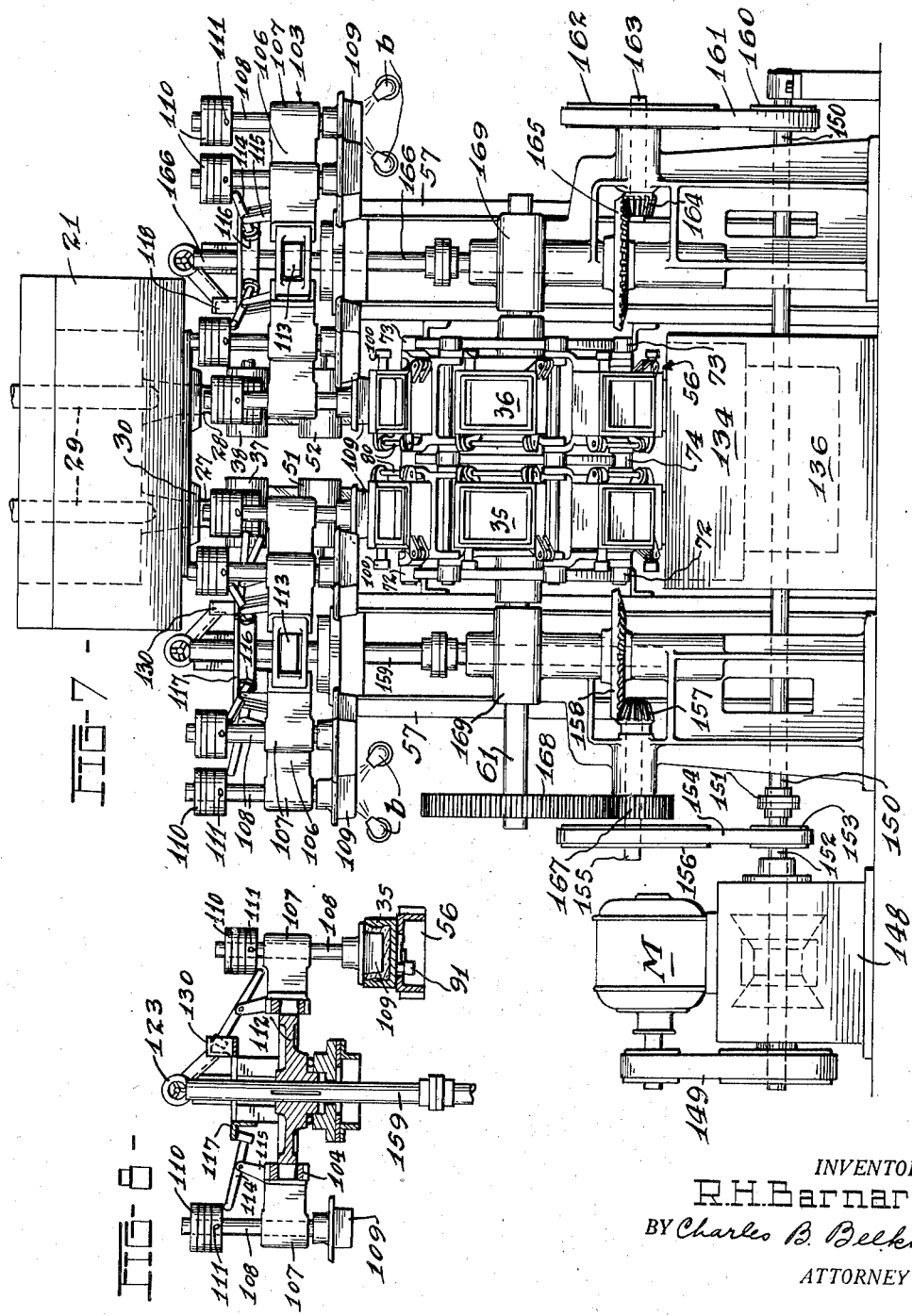
INVENTOR.
R.H.Barnard
BY Charles B. Belknap
ATTORNEY.

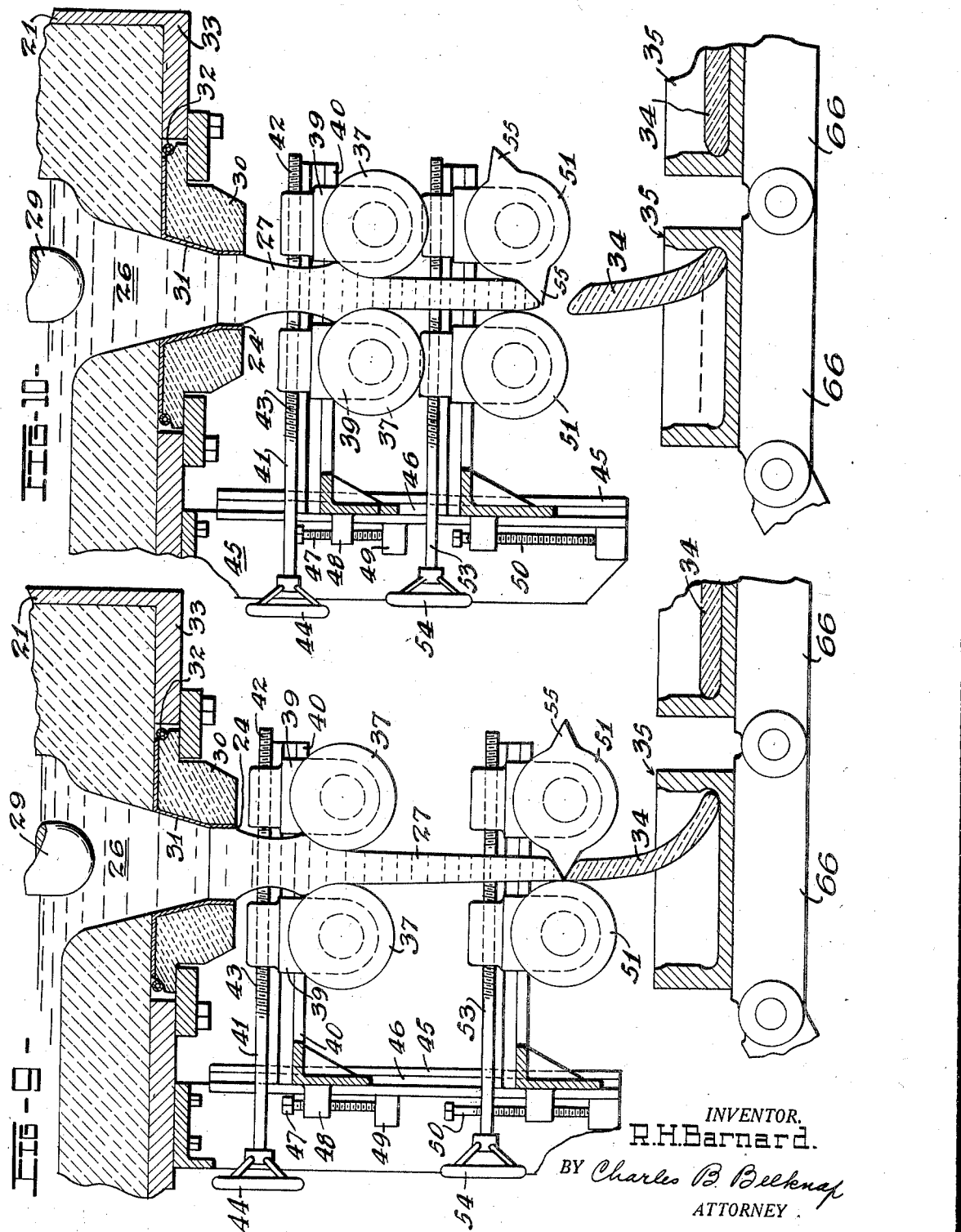

Nov. 7, 1939.   R. H. BARNARD   2,179,317
METHOD OF AND APPARATUS FOR FORMING GLASS BUILDING BLOCKS
Filed July 10, 1936   8 Sheets-Sheet 8
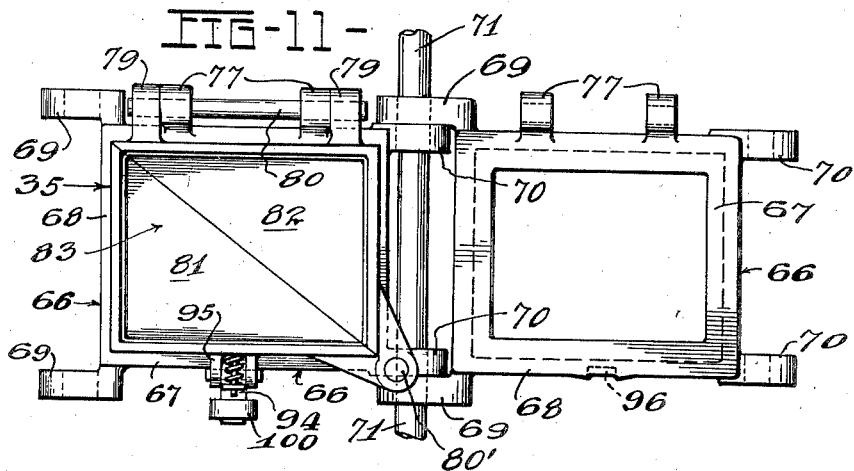
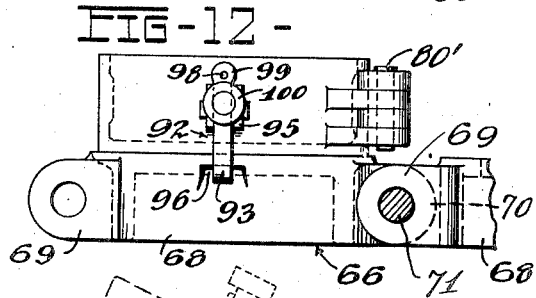
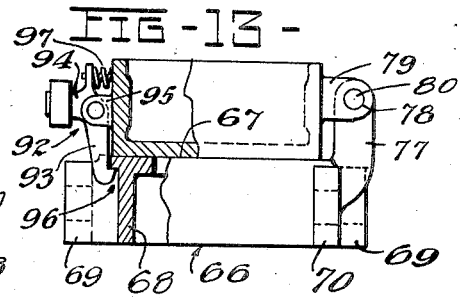
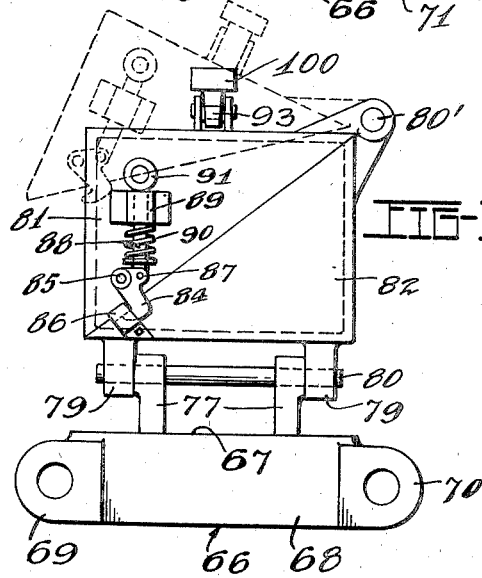
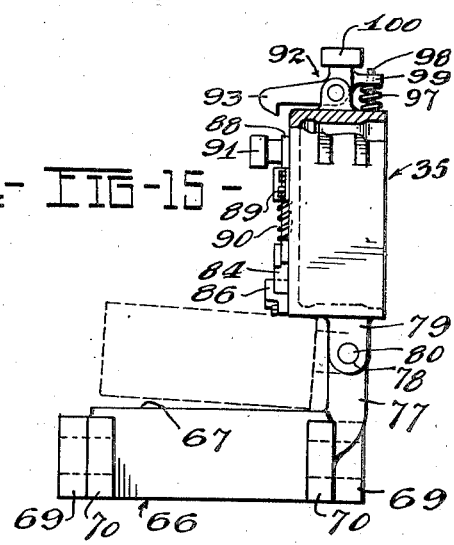
INVENTOR.
R. H. Barnard.
BY Charles B. Belknap
ATTORNEY.

Patented Nov. 7, 1939

2,179,317

UNITED STATES PATENT OFFICE 2,179,317

METHOD OF AND APPARATUS FOR FORMING GLASS BUILDING BLOCKS

Randolph H. Barnard, Toledo, Ohio

Application July 10, 1936, Serial No. 89,968

21 Claims. (Cl. 49—5)

The present invention relates to improvements in the art of shaping charges of molten glass into desired forms of glassware. More specifically, the invention relates to a method of and an apparatus for forming hollow glass structural bulding blocks.

The principal object of the invention is to provide a rugged and durable apparatus for forming hollow, hermetically sealed, glass structural building blocks, which is entirely automatic in its operation. In carrying out this object, the invention contemplates the provision of an apparatus in which molten glass in the form of adjacent controlled streams, issuing from adjacent outlet openings in a container, are shaped into descending columns of suitable width for reception in respective molds and are severed periodically into measured mold charges or masses for reception in the molds, such initial forming and severing operations taking place without interruption of the continuous and uniform flow of the glass. The preformed mold charges or gobs, are individually received in adjacent, two-part, separable molds which travel in pairs, and are operated upon during a portion of their travel by respective pairs of gravity actuated pressing plungers that shape the material in the molds into half-sections of the finished article which are designed to be subsequently joined together in the apparatus. The adjacent pairs of travelling molds, containing the formed half-sections above referred to, are inverted and passed over a pool of a liquefied cementing or binding medium in such a manner that the edges of the half-sections, which are designed for joining, become reheated and coated with the binding material. The adjacent molds of each traveling pair are then brought into opposed positions wherein the coated edges of the half-sections contained therein are yieldably pressed together and a permanent juncture effected. The individual adjacent separable molds of each traveling pair, containing the completed article therebetween, are then opened to allow the finished article to be withdrawn.

Other features and advantages of the invention will appear hereinafter.

In the accompanying drawings:

Fig. 1 is a side elevational view of a glass block forming apparatus manufactured in accordance with the principles of the present invention;

Fig. 2 is a sectional view taken substantially along the line 2—2 of Fig. 1 in the direction indicated by the arrows;

Fig. 3 is a top plan view of the apparatus shown in Fig. 1, certain portions of the apparatus being removed to more clearly reveal the nature of the invention;

Fig. 4 is a side elevational view of the apparatus, similar to Fig. 1, certain portions thereof being shown in section to diagrammatically reveal the manner in which the molds are filled and the material therein operated upon;

Fig. 5 is a sectional view taken substantially along the line 5—5 of Fig. 4 in the direction indicated by the arrows;

Fig. 6 is an end elevational view of the apparatus taken from the forward or feeding and discharge end thereof;

Fig. 7 is an end elevational view of the apparatus taken from the rear or dipping end thereof;

Fig. 8 is a sectional view taken substantially along the line 8—8 of Fig. 3 in the direction indicated by the arrows;

Fig. 9 is an enlarged fragmentary sectional view taken through a glass feeder in the vertical plane of one of the outlet openings thereof and showing a pair of adjustable forming and cutting rolls employed in connection with the present invention;

Fig. 10 is a sectional view similar to Fig. 9, showing the forming and cutting rolls in a different position.

Fig. 11 is a top plan view of one of a series of individual sectional molds employed in connection with the invention and illustrating the manner in which the adjacent mold carrying links may be joined;

Fig. 12 is a side elevational view of the mold shown in the preceding figure;

Fig. 13 is an end view, partly in section, of the mold shown in Figs. 11 and 12;

Fig. 14 is a bottom plan view of the mold shown in Figs. 11, 12 and 13, showing the same in extended position for cooperation with an adjacent mold in joining the half-sections of the article together; and Fig. 15 is an end elevational view of the mold structure shown in Fig. 14.

Referring now to Figs. 1, 2, 9 and 10, a glass melting or refining furnace is shown at 20. A boot 21 or extension projects laterally from the furnace 20 and is supported adjacent its inner end upon the metal framework 22 of the furnace. The outer end of the extension 21 is suitably suspended by means of tie rods, one of which is shown at 23.

The extension 21 is provided with a pair of adjacent bottom outlet openings 24 and 25, through which openings molten glass 26 is adapted to flow in the form of a pair of adjacent descending columns or streams 27 and 28 respectively, the size and volume of which are controlled by means of conventional regulating plugs 29. The openings 24 and 25 are lined with replaceable refractory material 30 which, in turn, is lined with platinum sheet metal 31. Suitable water jackets 32 extend around the juncture between the refractory material and the furnace wall 33.

The descending molten glass columns or streams 27 and 28 are adapted to be formed into individual masses or mold charges 34, sometimes referred to as "gobs", which are deposited into a series of individual molds 35 and 36, the character and function of which will presently appear. The widths of the descending columns 27 and 28 are slightly less at the furnace openings than the width of the individual molds 35 and 36 in which they are received, but in the formation of the individual gobs 34, they are transformed into a ribbon-like stream and brought to the proper width and thickness by means of shaping and sizing units including adjacent pairs of horizontal rotary forming rolls 37 and 38, between which the respective columns 27 and 28 pass.

The units, including the forming rolls 37 and 38, are substantially identical in their assembly and each consists in a pair of supporting slide blocks 39 adjustably mounted upon and supported by a guide 40 for movement toward and away from each other to vary the thickness of the individual mold charges 34. The adjusting mechanism for varying the spaced relation between the two sizing and shaping units as regards the center to center distance between the rolls 37 and 38, in order to control the thickness of the mold charges, consists of an elongated rod 41 oppositely threaded as at 42 and 43 for respective threaded engagement with the supporting slide blocks 39. A hand wheel 44 is carried on one end of the rod 41. The supporting guide 40 is mounted for vertical adjustment in a bracket 45, bolted or otherwise secured to the underneath side of the furnace extension 21, and provided with vertical grooves 46 in which the guide 40 rides. An adjusting bolt 47 for varying the heighth of the guide 40 extends through a portion of the guide as at 48 and engages a stationary part 49 of the bracket 45.

Positioned beneath the adjacent pairs of forming rolls 37 and 38, and similarly mounted for vertical adjustment in the bracket 45 by means of adjusting bolts 50, are adjacent pairs of cutting rolls 51 and 52 respectively. The rolls of each pair are adjustable toward and away from each other by means of adjusting rods 53, carrying hand wheels 54. One roll of each pair is provided with a pair of oppositely extending, diametrically opposed, knife blades 55, integrally formed on the roll and designed to successively engage its respective descending column 27 or 28 and, using the roll 51 or 52, of which it is a counter-part, as a backing or anvil, sever the column into the desired lengths. The means for actuating the adjacent pairs of forming rolls 37, 38, and cutting rolls 51, 52, will be fully set forth hereinafter.

Referring now to Figs. 1, 2, 4, 6 and 7 for the best illustration, a horizontally disposed endless mold conveyor or carrier, designated in its entirety at 56, has one end thereof supported in the framework 57 of the machine upon a series of axially aligned sprockets 58, 59 and 60 (see Fig. 5), mounted upon a transverse drive shaft 61 positioned adjacent the rear end of the machine. The other end of the conveyor 56 is supported upon similar sprockets 62, 63 and 64, mounted upon a shaft 65 transversely positioned in the machine adjacent the forward end thereof.

The endless mold conveyor 56 includes two parallel series of interconnected links 66 (Figs. 1, 2 and 4), each having a flat table-like portion 67, the center of which is cut away for the purpose of decreasing the weight of the conveyor and to provide clearance for the mold locking device to be described hereinafter. Each of these links is provided with depending side flanges 68 from which there project forwardly, a pair of widely separated attachment ears 69, and rearwardly, a pair of relatively closely spaced attachment ears 70. The attachment ears 70 of each individual link 66 fit within the ears 69 of the next adjacent link and are held in position therebetween and pivoted thereto by an elongated transversely extending hinge pin 71 (Fig. 2) carrying outer rollers 72 and 73 designed for engagement with the sprockets 58, 62, and 60, 64, respectively, and a medially disposed roller 74 designed for engagement with the sprockets 59 and 63. The medially disposed rollers 74 on the pins 71 provide spacing elements for maintaining the adjacent pairs of links 66 in their proper spaced relationship. In their travel longitudinally along the machine between the sprockets 58, 59, 60 and the sprockets 62, 63, 64, the rollers 72, 74, 73, are supported upon upper guide rails 75 (Figs. 2 and 6) and lower guide rails 76 which are suitably mounted on the stationary framework 57 of the machine. As will be observed in Figs. 3 and 4, the links 66 which carry the molds 35 and 36, are arranged in pairs and travel side by side in the cycle of operations.

The adjacent inner side flanges 68 (Figs. 2 and 11 to 15) of each opposed pair of links 66 have formed thereon a pair of outwardly and upwardly extending attachment lugs 77 having aligned apertures 78 in their outer ends. The molds 35 and 36 are pivoted to the attachment lugs 77 of adjacent links 66 respectively, and accordingly, each mold is provided with attachment ears 79 that straddle the attachment lugs 77 and are secured thereto by a pivot pin 80.

The adjacent molds 35 and 36 are identical in construction and a description of one will suffice for the other. Each mold (Fig. 11) consists of a pair of separable mold sections 81 and 82, hinged as at 80', the latter section carrying the attachment ears 79 above referred to. The sections 81 and 82, when closed upon each other as shown in Fig. 11, provide an open mold cavity 83 of rectilinear outline, although other shapes are contemplated. The cavities 83 are adapted to receive therein the individual mold charges which are severed from the molten glass columns 27 and 28.

The mold sections 81 and 82 are normally held closed by means of a latch 84, pivoted at 85 on the underneath side of the section 81 and designed to cooperate with a bracket 86 in maintaining the mold sections closed. The latch 84 is provided with a near 87 to which is pivoted a link 88 slidably mounted in a bracket 89 on the underneath side of the section 81. A coil spring 90, surrounding the link 88, bears against the bracket 89 at one end thereof, and against the ear 87 at the other end thereof to normally urge the latch 84 into its locking position. The free end of the link 88 is provided with a roller 91 which controls the operation of the latch 84 as will be set forth presently.

The mold sections 81 and 82, when closed, normally occupy a position with the bottom of the mold resting upon the flat table-like top 67 of the conveyor link 66 upon which the mold is mounted. In order to hold the closed mold in this position, a latch 92 in the form of a bell crank lever, having a long arm 93 and a short arm 94, is pivoted between a pair of ears 95 formed on the outwardly disposed side of the mold. The long arm 93 is designed for locking engagement with a recess 96 in the outer side flange 68 of the conveyor link 66 and is normally urged into its locking position by means of a coil spring 97 centered upon a pin 98 and interposed between one side of the mold and a projecting ear 99 formed on the latch 92. The outer end of the short arm 94 is provided with a roller 100 which, in addition to controlling the operation of the latch 92, controls the outward swinging movement of the closed mold unit in a manner that will be set forth hereinafter.

Referring now to Figs. 3 and 4, a pair of endless carrier assemblies or units, designated in their entirety at 101 and 102, are supported in the framework 57 of the machine above the mold conveyor 56. A plurality of vertically movable, gravity actuated, pressing or forming plunger units 103 are mounted upon the carrier assemblies 101 and 102 and are adapted to cooperate with the charged molds 35 and 36 to finally form or shape the half-sections of the finished article. The carrier assemblies 101 and 102 are substantially identical in their construction and a description of one will, therefore, suffice for the other.

Each assembly (Figs. 1, 3, 5, 7 and 8) consists of an endless moving carrier made up of a plurality of individual plunger carrying links 104 which are uniformly spaced apart by means of spacing links or spacers 105. The links 104 are preferably in the form of castings having outwardly extending, horizontal plunger carrying arms 106 provided with enlarged heads 107 through which the plunger units 103 are vertically slidable into and out of operative position.

Each plunger unit 103 consists of a vertical stem 108 or rod, the lower end of which is provided with a forming die 109, and the upper end of which is provided with a plurality of removable weights 110. The lowermost weight supports the other weights and to this end is anchored in position on the stem in any suitable manner, as, for example, by means of a set screw 111.

The endless moving portion of each plunger carrier assembly is mounted upon sprockets 112 and 113, the vertical axes of which occupy common planes on opposite sides of the machine parallel to the longitudinal axis of the machine. The assemblies 101 and 102 have adjacent straightaway portions that substantially overlie the upper straightaway portion of the conveyor 56 in such a manner that the plunger units 103 may cooperate with the traveling molds 35 and 36 in forming the respective half-sections of the finished article. The driving means for the carrier assemblies 101 and 102, wherein the carriers and the conveyor are driven at the same rate of speed will be set forth hereinafter.

As the cutting rolls 51 and 52 sever the mold charges 34 from the columns 27 and 28 respectively, they are individually received in the adjacent pairs of molds 35 and 36 in the manner disclosed in Figs. 9 and 10. The individual plunger units 103, as they come into the straightaway portions of the carrier assemblies 101 and 102, above referred to, become aligned with the individual molds 35 and 36 and are adapted at predetermined points in the rearward travel of the molds toward the dipping end of the machine to descend by gravity into the charged molds to shape the half-sections of the glass articles.

In the proximity of the dipping end, the plungers or dies are withdrawn from the molds and, accordingly, a plurality of lifting levers 114 are pivoted medially of their ends to attachment ears 115 formed on the links 104 of the carriers 101 and 102. The outer ends of the lifting levers 114 engage the underneath side of the lowermost weights 110 of the plunger units 103 for the purpose of lifting the same. The inner ends of the levers 114 are provided with rollers 116 which, during the inoperative travel of the plunger units 103, bear against the underneath side of channel shaped guide rails 117 (Figs. 1, 3, 4 and 7), the elevation of which is such that the plunger units 103 will remain in their uppermost or inoperative position.

The guide rails 117 of each carrier assembly are provided with adjustable extensions 118 (Figs. 4 and 7) in the straightaway portions thereof which, like the rails 117, are of angle shape formation and are provided with upwardly inclined portions 119 and elevated offset portions 120. Thus, the rollers 116, in following the elevations provided by these portions, permit the plunger units 103 to be lowered by gravity into operative engagement with the filled molds 35 and 36 with which they are in alignment at the commencement of the rearward travel of the molds in the machine.

In lowering the weighted plunger units 103 into operative engagement with the filled molds 35 and 36, it is essential that the molten glass gobs 34 in the molds should settle and reach a predetermined temperature before the forming dies 109 are brought into contact therewith. In order to hasten or delay the initial contact of the dies with the glass in the molds, means is provided for adjusting the longitudinal position of the extensions 118 in the machine along the straightaway path of travel of the plunger units 103.

Toward this end, in Fig. 3 there is shown an elongated support 121 positioned longitudinally and centrally of each conveyor 101 and 102. An adjusting rod 122, having a hand wheel 123 on one end thereof, is rotatably mounted in a pair of brackets 124, and is provided with a threaded central portion 125 which is threadedly received in a block 126 carried by the extension 118. It is obvious that turning movement of the hand wheel 123 in one direction or the other will cause longitudinal movement of the extension 118.

The forming dies 109 as shown in Fig. 5 are each provided with a rectilinear body portion 127 of somewhat smaller dimensions than the cavity 83 of the molds 35 and 36 to permit the molten glass in the molds to flow upwardly around the sides of the same under pressure applied by the forming dies during the shaping of the half-sections of the glass blocks. This upward flow of the glass around the sides of the body portion of the dies 109 is limited by an outwardly extending marginal flange 128 integrally formed with the body portion adjacent the top thereof. The flange 128 overlies and bears against the upper margins of the sides of the closed mold. The underneath side of the flange 128 is provided with a marginal groove 129 into which the glass is forced under pressure applied by the forming dies in order that the extreme edge of the half-sections, when formed, will project upwardly a slight distance above the mold sides.

The forming dies 109, which descend by gravity into the molds 35 and 36 at the precise instant when temperature conditions are ideal, as previously described, are adapted to remain in the molds during a major portion of their rearward travel until such time as temperature conditions in the glass will warrant their withdrawal preparatory to joining the half-sections together. Accordingly, a channel-shaped adjustable extension 130 (Figs. 1 and 3) is provided on each guide 117 adjacent the dipping end of the machine. The extensions 130 are similar to the extensions 118 and are each provided with a downwardly inclined portion 131 and an offset portion 132 of low elevation adapted to receive and guide the rollers 116 downwardly adjacent the end of their longitudinal straightaway travel in the machine. The rollers 116, upon moving downwardly in the manner just described, cause the plunger units 103 to be elevated, thus withdrawing the forming dies 109 from the molds 35 and 36 containing the formed or shaped half-sections of the blocks. An adjusting mechanism 133 is provided for each extension 130 which is identical with the previously described adjusting mechanisms provided for the extensions 118. By varying the longitudinal position of the adjustable extensions 130 and 118 in the machine, the initial point of entry of the forming dies 109 into the molds and the point of withdrawal of the dies therefrom may be shifted as required by varying temperature conditions of the molten glass in the molds. In so shifting the longitudinal positions of the extensions 118 and 130, the controlling factor which determines the length of time the forming dies 109 remain in the molds is the distance existing between inclined portions 119 and 131 respectively of the extensions.

Immediately after withdrawal of the plunger units 103 from their respective molds 35 and 36, the mold units are inverted in passing around the dipping end of the conveyor 56 and the edges of the adjacent half-sections of the blocks which project beyond the side edges of the molds are simultaneously dipped in a bath of bonding medium or cement preparatory to joining the edges of the block sections together. Toward this end, a reservoir 134 containing a bonding material, as for example, molten aluminum, is positioned underneath the dipping end of the conveyor 56. Any one of various means may be provided for maintaining the aluminum in a molten state and in the present instance, hot flue gases which pass through a space 135 in a refractory support 136 are employed for this purpose. The level of the molten aluminum is maintained sufficiently high that the molds which travel downwardly around the rear end of the conveyor 56 and level off above the reservoir 134 cause the projecting edges of the adjacent half-sections contained therein to be dipped in the molten aluminum to become coated therewith. In order that the molds may clear the forward edge of the reservoir 134, the lower guide rails 76 of the conveyor 56 are provided with a gradual bend which, although not apparent in the drawings, may be visualized by an inspection of Figs. 1 and 4.

With reference to the molten aluminum which is employed as a bonding medium, it should be understood that this material is heated in the reservoir 134 to a temperature considerably above its melting point in order to quickly raise the temperature of the projecting edges of the glass half-sections to a degree at which it will absorb and form a permanent union with the aluminum. Thus, a continuous film which is essential to the creation of a satisfactory bond and a hermetic seal between the half-sections is provided on the projecting edges thereof.

Upon completion of the dipping operation, the inverted molds 35 and 36, which have been elevated to clear the forward edge of the reservoir 134, proceed forwardly in the machine and, in so doing, the rollers 100 that project outwardly on opposite sides of the machine from the sides of adjacent molds, successively enter the open ends 137 of respective grooves or channels 138 provided in a pair of guide rails 139 or cams. The guide rails 139 (Figs. 1, 4 and 6) converge from points above the reservoir 134 abruptly downwardly as at 140 and extend forwardly in the machine in close parallel relation as at 141.

As each pair of molds 35 and 36 issues from the dipping operation, the rollers 100 thereof (Fig. 13) which are mounted upon the short arms 94 of the latches 92, and which enter the grooves or channels 138 of the rails 139, are moved in such a manner that the long arms 93 are moved from their locking engagement with the recesses 96 to permit the molds to swing downwardly about the pivot pins 80 as the rollers 100 continue in the path provided by the channels 138.

Upon reaching the bottom of the abrupt inclined portions 140 of the guide rails 139, the open sides of the mold cavities 83 are opposed to each other in such a manner that the edges of the half-sections contained therein and which have been coated with molten aluminum are brought together and are held in aligned abutting position with sufficient pressure to effect a union of the half-sections.

The distance between the parallel portions 141 of the guide rails 139 is slightly less than the center to center distance between the rollers 100 when the molds of adjacent pairs are in position for joining the adjacent half-sections. The lost motion that would ordinarily occur by virtue of the limited pivotal movement of the latches 92 is taken up by the coil springs 97 which are placed under compression. In this manner the size or capacity of the coil springs 90 may be depended upon to regulate the degree of pressure employed in joining the half-sections of the blocks together.

Referring now to Fig. 4, it will be seen that when the molds 35 and 36 are in their extended position with the rollers 100 occupying a position within the channels 138 provided in the parallel portions 141 of the guide rails 139, the rollers 91 which control the opening of the sections 81 and 82 of each mold, are brought into alignment with the open ends 142 of respective grooves or channels 143 provided in a pair of guide rails 144 which extend forwardly and downwardly as at 145 and upwardly as at 146. As the molds 35 and 36, containing the joined half-sections of the blocks therebetween, move forwardly in the machine, the rollers 91 enter the grooves 143 just referred to and, upon initially moving downwardly therein, cause the latches 84 to be withdrawn from their locking cooperation with the brackets 83 against the action of the coil springs 97 to permit the sections 81 and 82 of adjacent molds 35 and 36 to be simultaneously opened. As the rollers 91 continue in their downward path in the grooves or channels 143, the lower sections 81 of the molds 35 and 36 are swung about the pivot pins 80' to the extreme position shown in Fig. 4 with the rollers 91 occupying a position in the channels 143 at the lowermost regions thereof. In this position, the completed blocks carried jointly by the molds 35 and 36 are discharged by gravity onto a conveyor 210 by means of which they are removed from the machine. It is to be noted that inasmuch as the half-sections of the blocks are assembled at a relatively high temperature, a correspondingly high vacuum will be created within the blocks upon cooling of the same. This phenomenon is of considerable importance in that it eliminates the condensation of moisture on the interior surfaces of the blocks while at the same time the insulating properties of the blocks are materially improved.

As the molds 35 and 36 continue in their endless path of travel around the forward end of the conveyor 56, the rollers 91 move upwardly in the inclined portions 146 of the guide rails 144. Thus the sections 81 of the molds 35 and 36 are swung about the pivot pins 80' and are closed upon the sections 82 in a region adjacent the extreme forward end of the conveyor 56.

The closed molds 35 and 36 in this position remain extended in parallel relation with the rollers 100 projecting outwardly in close proximity to each other. In order to swing the molds away from each other to bring the bottom thereof into position on the table-like tops 67 of the conveyor links 66, a pair of upwardly and outwardly diverging guide rails 147 (Figs. 1 and 3) are mounted on the forward portion of the framework 57 of the machine in such a manner that when the rollers 91 are released from the channels 143 of the guide rails 144, the rollers 100 are engaged by the guide rails 147 which, acting in the manner of wedge, swing the depending extended molds 35 and 36 outwardly about their pivots 80 until they come to rest upon the flat table-like tops 67 of the conveyor links 66 where they are locked by the latches 92. In this position the closed molds are again ready to receive the severed gobs 34 issuing from the molten glass columns 27 and 28.

As shown in Fig. 1, a plurality of nozzles $a$ positioned above the conveyor 56 serve to direct streams of air or other cooling fluid into the open mold cavities 83 to cool the molds after they have discharged their contents onto the conveyor 210.

Similarly, a plurality of nozzles $b$, positioned adjacent the dipping end of the machine serve to direct streams of air horizontally onto the forming dies 109 after they have been withdrawn from pressing contact with the hot charges of molten glass in the molds 35 and 36.

The driving connections for the various operative moving parts of the machine are best illustrated in Figs. 1 to 8 inclusive. The cutting rolls 51 and 52, the endless carriers 101 and 102, and the mold carrying conveyor 56 are driven from a common source of power in the form of an electric motor M. The forming rolls 37 and 38 are driven from independent sources of power in the form of independently operated variable speed electric motors M' and M'' respectively.

The motor M (Fig. 7) is mounted upon a gear reduction device 148 and is operatively connected thereto by means of a belt 149. A transverse shaft 150 is mounted for rotation in the machine adjacent the bottom thereof and is connected at 151 to the driven shaft 152 of the gear reduction device 148. A driving pulley 153 is mounted upon the shaft 150 at one side of the machine and serves to transmit motion through a belt 154 to a short transverse shaft 155 suitably journalled in the frame 57 and having a driven pulley 156 mounted on the outer end thereof for cooperation with the belt 154. The inner end of the shaft 155 is provided with a bevel gear 157 which meshes with another bevel gear 158 carried by the lower end of a vertically extending shaft 159 upon which the driving sprocket 113 of the carrier assembly 101 is mounted.

The carrier assembly 102 is similarly driven from a second pulley 160 mounted on the shaft 150 on the opposite end thereof from the pulley 153, through the belt 161, pulley 162, shaft 163, bevel gears 164 and 165, and vertical shaft 166 upon which the driving sprocket 113 of the assembly 102 is mounted.

In order to drive the conveyor assembly 56, a gear 167 (Figs. 6 and 7) of relatively small proportions is mounted medially upon the shaft 155 and meshes with another gear 168 of larger proportions which is mounted upon the shaft 61 carrying the driving sprockets 58, 59 and 60 of the conveyor 56 (see Fig. 2). The shaft 61 is journalled in bearings 169 supported on the frame 57 of the machine.

The driving connections for operating the cutting rolls 51 are best illustrated in Figs. 1, 3 and 6. The idler sprocket 112 of the carrier assembly 101 is mounted upon a vertically extending shaft 170 which carries at its lower end a bevel gear 171. A cooperating bevel gear 172 is mounted upon a horizontally and obliquely extending shaft 173 which is connected through a universal joint 174 to a horizontal shaft 175 suitably journalled in bearings 176 mounted on the frame 57. A pair of bevel gears 177 are positioned medially on the shaft 175 and mesh with respective bevel gears 178 mounted on the lower ends of a pair of parallel adjacent vertically extending shafts 179. The upper ends of the shafts 179 have mounted thereon bevel gears 180 that mesh with respective bevel gears 181 which transmit motion through flexible shafts 182 to the cutting rolls 51.

The cutting rolls 52 are similarly driven from the shaft 183 upon which the idler sprocket 112 of the carrier assembly 102 is mounted, through bevel gears 184 and 185, oblique shaft 186, universal joint 187, shaft 188, bevel gears 189 and 190, vertical shafts 191, bevel gears 192 and 193, and flexible shafts 194.

The forming rolls 37 and 38 are adapted to be driven from the independently operable variable speed motors M' and M'' respectively in order that variable conditions of temperature and viscosity affecting the rate and character of the flow of molten glass from the outlet openings 24 and 25 of the furnace extension 21 may be compensated for to insure uniform size of the gobs 34 delivered to the molds 35 and 36.

The motor M' which is provided with a rheostat R' is positioned upon an extension 195 of the frame 57 and the shaft 196 thereof is connected through a worm and gear reduction device 197 to a longitudinally extending shaft 198 having mounted thereon medially of its ends, a pair of bevel gears 199. The bevel gears 199 mesh with similar bevel gears 200 mounted upon respective stub shafts 201 rotatably supported in bearings 202 carried by the frame 57. Flexible shafts 203 connected at one end thereof to the stub shafts 201 and at the other end to the forming rolls 37 complete the driving connection to these forming rolls from the motor M'.

The forming rolls 38 are similarly driven from the motor M'' which is provided with a rheostat R'' through the worm and gear reduction device 204, shaft 205, bevel gears 206 and 207, stub shafts 208, and flexible shafts 209.

Various modifications may be resorted to without departing from the spirit of the invention. For example: While I have illustrated my invention as including the use of a bonding medium, it may be dispensed with by bringing the edge portions of the block sections together immediately following the pressing operation. Thus a glass to glass bond will be effected. Such a feature I consider within the scope of my invention.

I claim:

1. A machine for automatically producing hollow glass articles from molded sections comprising means for flowing adjacent streams of molten glass, means for severing mold charges from said streams, a plurality of molds arranged in pairs to which the severed charges are delivered by gravity, each mold being adapted to impart the exterior contour of an article to a charge, means for pressing the mold charges to completely form article sections, cam means for manipulating the molds of each pair with the article sections therein to effect a union between certain surfaces of the sections therein while they are hot and thereby complete the articles, and cam means for manipulating the molds of each pair to discharge the completed articles from the machine.

2. The method of forming glass articles in a machine having a series of molds which consists in continuously discharging molten glass from a pair of adjacent openings in a refining tank, shaping the resultant descending columns to the approximate width of the molds, simultaneously severing said columns periodically into gobs of a length suitable for reception in the molds, receiving said gobs individually in adjacent molds, shaping said gobs in the molds into sections of the finished articles, inverting the adjacent molds and passing the same over a reservoir containing a bonding medium to coat the edges of the half-sections therewith, moving the adjacent molds bodily into juxtaposition to bring said coated edges into contact with each other while hot, and simultaneously opening said adjacent molds to discharge the completed articles.

3. The method of forming glass building blocks in a machine having a series of molds which consists in continuously discharging molten glass from a pair of adjacent openings in a refining tank, compressing the resultant descending columns to widen the same to the approximate width of the molds, severing said columns periodically into gobs of a length suitable for reception in the molds, receiving said gobs individually in adjacent molds, shaping said gobs in the molds into half-sections of the finished blocks, coating the exposed edges of said half-sections while in the molds with a bonding medium, moving the adjacent molds bodily into juxtaposition to bring said coated edges into contact to join the same, and discharging the joined half-sections from the molds.

4. In an apparatus for continuously forming glass blocks or similar articles, a furnace provided with a pair of adjacent outlet openings through which molten glass is discharged in the form of a pair of descending columns, instrumentalities for continuously forming and periodically severing said columns into mold charges, an endless conveyor positioned beneath said furnace openings, a plurality of molds arranged in pairs and endlessly movable with the conveyor in double file formation, the corresponding molds of each pair being adapted to successively receive therein the severed charges from a single column, means for moving said conveyor in timed relation to the periodic severing of said charges, means for automatically forming said charges in the molds into half-sections of the finished block, and means for bodily moving the molds of each pair into juxtaposition to bring the formed charges into joining contact.

5. A glass block forming machine comprising in combination, a horizontal endless conveyor, a plurality of molds arranged in transversely spaced pairs on the conveyor, said molds when occupying positions on the upper straightaway portion of said conveyor having upwardly presented open mold cavities, means for simultaneously discharging measured quantities of molten glass into said upwardly presented cavities of the molds of each successive pair adjacent the forward end of said conveyor, a pair of horizontally disposed endless carriers each movable about a pair of vertical axes, a plurality of vertically movable plunger units carried by and endlessly movable with said carriers, said plunger units when occupying positions in the adjacent straightaway portions of the carriers being aligned with respective molds of each pair, means for driving said conveyor and carriers synchroneously whereby said straightaway portions thereof will move in the same direction, means for causing said plunger units to descend into operative forming engagement with the respective molds with which they are in alignment adjacent the commencement of their rearward travel along said straightaway portions to form said quantities contained therein into half-sections of the finished block, means for elevating said plunger units from operative engagement with their respective molds adjacent the end of their travel along said straightaway portions, a reservoir positioned beneath said conveyor adjacent the rear end thereof, said reservoir containing a molten bonding medium, said molds upon becoming inverted by passing around said rear horizontal axis being adapted to pass over said reservoir and immerse the edges of the formed half-sections contained therein in said bonding medium to coat the same, and means for moving the molds of each pair relative to each other into axial alignment with the cavities thereof in opposed relationship to join the coated edges of the half-sections adjacent the commencement of their forward travel in the lower straightaway portion of said conveyor.

6. In an apparatus for the continuous formation of glass blocks or similar articles, a furnace, means for continuously discharging molten glass from said furnace in the form of adjacent descending columns, instrumentalities for automatically shaping and severing said columns into individual masses of a desired shape and size, a series of normally closed sectional molds arranged in pairs, means for automatically delivering the severed masses of each column to respective molds of each pair, means for automatically forming the masses in adjacent molds into half-sections of the finished blocks, means for reheating the edge portions of said half-sections in adjacent molds, means for moving the molds of each pair bodily so as to bring said reheated edges of the half-sections contained therein into contact and unite them, and means for simultaneously opening the sectional molds of each pair to discharge the contents thereof.

7. In an apparatus for continuously forming glass blocks, a furnace provided with a pair of adjacent outlet openings through which molten glass is discharged in the form of a pair of adjacent descending columns, instrumentalities for continuously forming and periodically severing said endless columns into mold charges, an endless conveyor positioned beneath said furnace openings, a plurality of pairs of molds mounted on said conveyor, means for driving said conveyor in timed relation to the periodic severing of said mold charges to permit the mold charges issuing from each column to be received individually in respective molds of each pair, means for forming the mold charges in adjacent molds into half-sections of the finished blocks, and means for bodily moving the molds of each pair into juxtaposition to bring the half-sections contained therein into contact to join the same.

8. In an apparatus for the continuous formation of glass blocks or similar articles, an endless mold conveyor, a plurality of molds mounted on said conveyor in aligned spaced relationship, means for discharging measured quantities of molten glass successively into said molds, an endless plunger unit carrier, a plurality of spaced plunger units mounted on said carrier, said plunger units and molds occupying respective aligned positions throughout a portion of their respective endless paths of travel, cam means operable at a predetermined point in the path of travel of said carrier for causing each plunger unit to move into operative forming engagement with its respective aligned mold, cam means subsequently operable at a predetermined point in said path of travel for causing each plunger unit to be withdrawn from such operative engagement, means for varying the points at which said cam means become operable, and means for moving certain of said molds into juxtaposition with certain other molds to unite the formed contents thereof.

9. In an apparatus for the continuous formation of glass blocks or similar articles, an endless conveyor, a plurality of molds mounted on said conveyor in aligned spaced relationship, means for discharging measured quantities of molten glass successively into said molds, an endless carrier, a plurality of spaced plunger units mounted on said carrier, said plunger units and molds occupying respective aligned positions throughout a portion of their endless paths of travel, means operable at a predetermined point in the path of travel of said plunger units for causing each plunger unit to move into operative forming engagement with its respective aligned mold, means subsequently operable at a predetermined point in said path of travel for causing each plunger unit to be withdrawn from such operative engagement, and means for moving certain molds bodily into juxtaposition with certain other molds to join the formed contents thereof.

10. In an apparatus for the continuous formation of glass blocks or similar articles, a horizontally disposed endless conveyor movable about a pair of horizontal axes, a plurality of molds mounted on said conveyor in aligned spaced relationship, means for discharging measured quantities of molten glass successively into said molds, a horizontally disposed endless carrier movable about a pair of vertical axes, a plurality of spaced vertically movable plunger units mounted on said carrier, said plunger units and molds occupying respective aligned positions throughout a portion of their respective endless paths of travel, cam means operable at a predetermined point in the path of travel of said plunger units for causing each plunger unit to descend into operative forming engagement with its respective aligned mold, cam means subsequently operable at a predetermined point in said path of travel for causing each plunger unit to be withdrawn from such operative engagement, means for varying the point at which one of said cam means becomes operable, and means for moving certain of the molds bodily into juxtaposition with certain other molds to join the formed contents thereof.

11. In an apparatus for the continuous formation of glass blocks or similar articles, a horizontal endless mold conveyor movable about a pair of horizontal axes, a plurality of molds arranged in pairs and mounted on said conveyor in aligned spaced relationship, means for discharging measured quantities of molten glass successively into said molds, a horizontally disposed endless plunger unit carrier movable about a pair of vertical axes, a plurality of spaced vertically movable plunger units mounted on said carrier, said plunger units and molds occupying respective aligned positions throughout a portion of their respective endless paths of travel, cam means operable at a predetermined point in the path of travel of said plunger units for causing each plunger unit to descend into operative forming engagement with its respective aligned mold, cam means subsequently operable at a predetermined point in said path of travel for causing each plunger unit to be withdrawn from such operative engagement, means for varying the point at which said cam means become operable, and means for moving the molds of each pair bodily into juxtaposition to unite the formed contents therein.

12. In a glass block forming machine, a pair of adjacent molds having upwardly presented open mold cavities, means for discharging a measured mass of molten glass into each mold, a pair of forming dies of smaller cross-sectional area than the cross-sectional area of said molds and positioned above said molds in respective alignment therewith, means for causing said pair of forming dies to descend into the respective molds with which they are in alignment to force the molten glass therein upwardly around the sides thereof and above the level of the mold cavities to form half-sections of the finished block, the edges of which project upwardly from the mold cavities, a reservoir containing a bonding medium, means for inverting said molds over said reservoir to coat said projecting edges with a portion of said bonding medium, and means for tilting said molds toward each other to bring said coated edges into engagement to join the same.

13. The method of making hollow, hermetically sealed, structural glass blocks which consists in continuously discharging molten glass from a furnace, forming and separating the glass into measured masses of the desired amount and shape, delivering said separated shaped masses into individual molds arranged in pairs, forming half-sections of the blocks in said molds, inverting said molds and dipping the edge portions of said half-sections contained therein in a bath of molten aluminum to reheat the edge portions and effect adhesion of some of the aluminum thereto, tilting the molds of each pair to unite the aluminum-coated edge portions and form hollow, hermetically sealed blocks, and opening the molds of each pair to discharge the united half-sections therefrom.

14. In a glass block forming machine, a plurality of sectional molds arranged in pairs, the molds of each pair occupying adjacent positions in the machine, the sections of each mold normally remaining closed upon each other to provide a mold cavity, means for successively discharging measured mold charges of molten glass simultaneously into the cavities of adjacent molds, means for simultaneously transforming said mold charges in adjacent molds into half-sections of the finished blocks, means for successively tilting the molds of each pair toward each other to bring the edges of said half-sections into engagement and cause joining thereof, and means for successively opening the sections of the molds of each pair simultaneously to discharge the joined half-sections therefrom.

15. In an apparatus for the continuous formation of glass blocks or similar articles, a horizontally disposed endless conveyor movable about a pair of horizontal axes, two longitudinal series of molds mounted on said conveyor, means for discharging measured quantities of molten glass successively into said molds, a pair of horizontally disposed endless carriers movable about respective pairs of vertical axes, a plurality of spaced vertically movable plunger units mounted on said carriers, the plunger units of each carrier occupying aligned positions with the molds of a respective series throughout a portion of their endless path of travel, cam means operable at a predetermined point in the path of travel of said plunger for causing each plunger unit to descend into operative forming engagement with its respective aligned mold, cam means subsequently operable at a predetermined point in said path of travel for causing each plunger unit to be withdrawn from such operative engagement, and means for moving the molds of one series bodily to bring the half-sections carried thereby into joining contact with the half-sections carried by the other series.

16. In an apparatus for the continuous formation of glass blocks or similar articles, a horizontally endless mold conveyor movable about a pair of horizontal axes, a plurality of molds arranged in pairs and mounted on said conveyor in aligned spaced relationship, means for discharging measured quantities of molten glass successively into said molds, a horizontally disposed endless plunger unit carrier movable about a pair of vertical axes, a plurality of spaced vertically movable plunger units mounted on said carrier, said plunger units and molds occupying respective aligned positions throughout a portion of their respective endless paths of travel, means operable at a predetermined point in the path of travel of said plunger units for causing each plunger unit to descend into operative forming engagement with its respective aligned mold, means subsequently operable at a predetermined point in said path of travel for causing each plunger unit to be withdrawn from such operative engagement, means for varying the points at which said two last mentioned means become operable, and means for moving the molds of each pair bodily into juxtaposition to unite the formed contents thereof.

17. In a machine for forming glass articles, a plurality of partible sectional molds arranged in pairs, the molds of each pair occuping adjacent positions in the machine, the sections of each mold normally remaining closed upon each other to provide a mold cavity, means for successively discharging measured charges of molten glass simultaneously into the cavities of adjacent molds, means for simultaneously transforming said mold charges in adjacent molds into sections of the finished article, means for successively bringing the molds of each pair into juxtaposition to bring the edges of the sections carried thereby into contact and cause joining thereof, and means for successively opening the sections of the molds to discharge the joined sections therefrom.

18. In a machine for forming glass articles, a plurality of partible sectional molds arranged in pairs, the molds of each pair occupying adjacent positions in the machine, the sections of each mold when closed upon each other providing therebetween a mold cavity, means normally locking the sections of each pair upon each other, means for successively discharging measured charges of molten glass simultaneously into the cavities of adjacent molds, means for simultaneously transforming the mold charges in adjacent molds into sections of the finished article, means for successively bringing the molds of each pair into juxtaposition to bring the edges of the sections carried thereby into contact to cause joining thereof, and means for successively releasing said locking means.

19. In a machine for forming glass articles, a plurality of partible sectional molds arranged in pairs, the molds of each pair occupying adjacent positions in the machine, the sections of each mold when closed upon each other providing therebetween a mold cavity, means normally locking the sections of each pair upon each other, means for successively discharging measured charges of molten glass simultaneously into the cavities of adjacent molds, means for simultaneously transforming the mold charges in adjacent molds into sections of the finished article, means for successively bringing the molds of each pair into juxtaposition to bring the edges of the sections carried thereby into contact to cause joining thereof, and means for successively releasing said locking means and for opening the sections of the mold to discharge the joined sections therefrom.

20. In an apparatus for continuously forming glass blocks or similar articles, a furnace provided with a pair of adjacent outlet openings through which molten glass is discharged in the form of a pair of descending columns, instrumentalities for periodically severing said columns into mold charges, an endless conveyor positioned beneath said furnace openings, a plurality of molds arranged in pairs and endlessly movable with the conveyor in double file formation, the corresponding molds of each pair being adapted to successively receive therein the severed charges from a single column, means for moving said conveyor in timed relation to the periodic severing of said charges, means for automatically forming said charges in the molds into half-sections of the finished block, and means for bodily moving the molds of each pair into juxtaposition to bring the formed charges into joining contact.

21. In a mechanism for assembling the complementary sections of a hollow glass building block, the combination of a plurality of movable holders each adapted to support a block section, a container for a pool of molten metal, means for actuating the holders to dip edge portions of the block sections into said pool and metalize the same, and means for effecting removal of the sections from contact with the pool and bringing the coated edges of the sections together under pressure prior to setting of the coating.

RANDOLPH H. BARNARD.